United States Patent
Wieczorek et al.

(10) Patent No.: US 12,466,120 B2
(45) Date of Patent: Nov. 11, 2025

(54) METHOD AND DEVICE FOR REDUCING VARIATIONS IN THE EJECTION OF A PLASTIC MELT

(71) Applicant: BC Extrusion Holding GmbH, Bad Oeynhausen (DE)

(72) Inventors: Andre Wieczorek, Leoben (AT); Walter Josef Koelbl, Rust (AT); Peter Kromer, Vienna (AT)

(73) Assignee: BC EXTRUSION HOLDING GMBH, Bad Oeynhausen (DE)

( * ) Notice: Subject to any disclaimer, the term of this patent is extended or adjusted under 35 U.S.C. 154(b) by 476 days.

(21) Appl. No.: 17/793,933

(22) PCT Filed: Jan. 15, 2021

(86) PCT No.: PCT/EP2021/050847
§ 371 (c)(1),
(2) Date: Jul. 20, 2022

(87) PCT Pub. No.: WO2021/148329
PCT Pub. Date: Jul. 29, 2021

(65) Prior Publication Data
US 2023/0051629 A1    Feb. 16, 2023

(30) Foreign Application Priority Data
Jan. 21, 2020  (DE) ...................... 10 2020 101 387.6

(51) Int. Cl.
*B29C 48/92* (2019.01)
*B29C 48/25* (2019.01)
*B29C 48/395* (2019.01)

(52) U.S. Cl.
CPC .......... *B29C 48/92* (2019.02); *B29C 48/2522* (2019.02); *B29C 48/395* (2019.02);
(Continued)

(58) Field of Classification Search
None
See application file for complete search history.

(56) References Cited

U.S. PATENT DOCUMENTS

| 3,730,492 A | * | 5/1973 | Maddock | ................ B29C 48/51 366/82 |
| 2010/0055404 A1 | * | 3/2010 | Yamada | .................. B29C 48/95 428/156 |

(Continued)

FOREIGN PATENT DOCUMENTS

| DE | 19911820 C1 | 8/2000 | |
| DE | 102011002279 A1 | * 10/2012 | ............. B29B 7/423 |

(Continued)

OTHER PUBLICATIONS

JP H06865 A English translation (Year: 1994).*
(Continued)

*Primary Examiner* — Xiao S Zhao
(74) *Attorney, Agent, or Firm* — LEYDIG, VOIT & MAYER, LTD.

(57) ABSTRACT

A method for reducing fluctuations over time in discharge of a plastics composition when extruding plastics products, including melting plastics material in an extruder and supplying the plastics material to an extrusion die by way of one or more extruder screws arranged in the extruder, and conveying a plastics composition along an extrusion axis by rotating the one or more extruder screws as pressure builds up, wherein discharge of the plastics material at a transition region from the extruder to the extrusion die or in the extrusion die is kept constant by changing a rotational speed of the one or more extruder screws, and wherein changing the rotational speed is carried out within one revolution of the one or more extruder screws.

4 Claims, 4 Drawing Sheets

(52) U.S. Cl.
CPC ............ *B29C 2948/92019* (2019.02); *B29C 2948/92076* (2019.02); *B29C 2948/92409* (2019.02); *B29C 2948/9259* (2019.02); *B29C 2948/926* (2019.02); *B29C 2948/92885* (2019.02)

(56) References Cited

U.S. PATENT DOCUMENTS

| | | | |
|---|---|---|---|
| 2011/0121477 A1* | 5/2011 | Qiu .................... | B28B 17/0081 264/40.7 |
| 2013/0147078 A1* | 6/2013 | Matsubayashi ......... | B29C 45/77 425/149 |
| 2015/0037447 A1* | 2/2015 | Rechter ............... | B29C 48/2564 425/135 |
| 2016/0089814 A1* | 3/2016 | Selvasankar ........... | B29C 48/60 366/83 |

FOREIGN PATENT DOCUMENTS

| | | | |
|---|---|---|---|
| EP | 2392446 | A1 | 12/2011 |
| EP | 2660035 | A1 | 11/2013 |
| EP | 3000582 | A2 | 3/2016 |
| FR | 2499870 | A1 * | 8/1982 |
| GB | 998063 | A | 7/1965 |
| JP | H054271 | A | 1/1993 |
| JP | H06865 | A * | 1/1994 |
| JP | 2000225641 | A | 8/2000 |
| JP | 2014034135 | A | 2/2014 |

OTHER PUBLICATIONS

FR 2499870 A1 English translation (Year: 1982).*
Screw, Oxford Learner's Dictionaries (Year: 2017).*
DE-102011002279-A1 english translation (Year: 2012).*

* cited by examiner

METHOD AND DEVICE FOR REDUCING VARIATIONS IN THE EJECTION OF A PLASTIC MELT

CROSS REFERENCE TO RELATED APPLICATIONS

This application is a U.S. National Phase application under 35 U.S.C. § 371 of International Application No. PCT/EP2021/050847, filed on Jan. 15, 2021 and claims benefit to German Patent Application No. DE 10 2020 101 387.6, filed on Jan. 21, 2020. The International Application was published in German on Jul. 29, 2021 as WO 2021/148329 A1 under PCT Article 21(2).

FIELD

The invention relates to a method for reducing fluctuations over time in the discharge of plastics composition when extruding plastics products, in particular plastics pipes and plastics profiles, plastics material being melted in an extruder and being supplied to an extrusion die by way of one or more extruder screws arranged in the extruder, the paste-like plastics composition being conveyed along the extrusion axis by rotation of the extruder screw as pressure builds up. The invention also relates to a device for carrying out the method.

BACKGROUND

Methods and devices for extruding plastics compositions are well known in the prior art. For example, EP 3000582 A2 describes an extruder screw comprising stepped screw stages for influencing the plasticizing rate. EP 2392446 A1 discloses a method for optimizing the product quality.

However, the problem remains that, despite all the known solutions, the huge range of influences means that the plastics composition transferred to the die for producing a plastics product is not constant throughout the process and, in particular, the flow of the plastics composition is subject to fluctuations over time. The constancy of the flow characteristics of the paste-like composition differs depending on the plastics material being used or the geometry of, for example, the screw in conjunction with the prevailing temperature, as well as the geometry of the product to be produced and thus the die geometry. Moreover, the impact that the screw rotation has on the constancy of the discharge has long been known. So too has the fact that, with the same die geometry, the pressure build-up is dependent on the discharge or flow rate. Rising flow rates lead to higher pressures, and vice versa.

To produce plastics products having consistent quality, however, it is important specifically to provide a constant discharge rate of the plastics composition, since this has a direct impact on said quality.

SUMMARY

In an embodiment, the present disclosure provides a method for reducing fluctuations over time in discharge of a plastics composition when extruding plastics products, comprising melting plastics material in an extruder and supplying the plastics material to an extrusion die by way of one or more extruder screws arranged in the extruder, and conveying a plastics composition along an extrusion axis by rotating the one or more extruder screws as pressure builds up, wherein discharge of the plastics material at a transition region from the extruder to the extrusion die or in the extrusion die is kept constant by changing a rotational speed of the one or more extruder screws, and wherein changing the rotational speed is carried out within one revolution of the one or more extruder screws.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
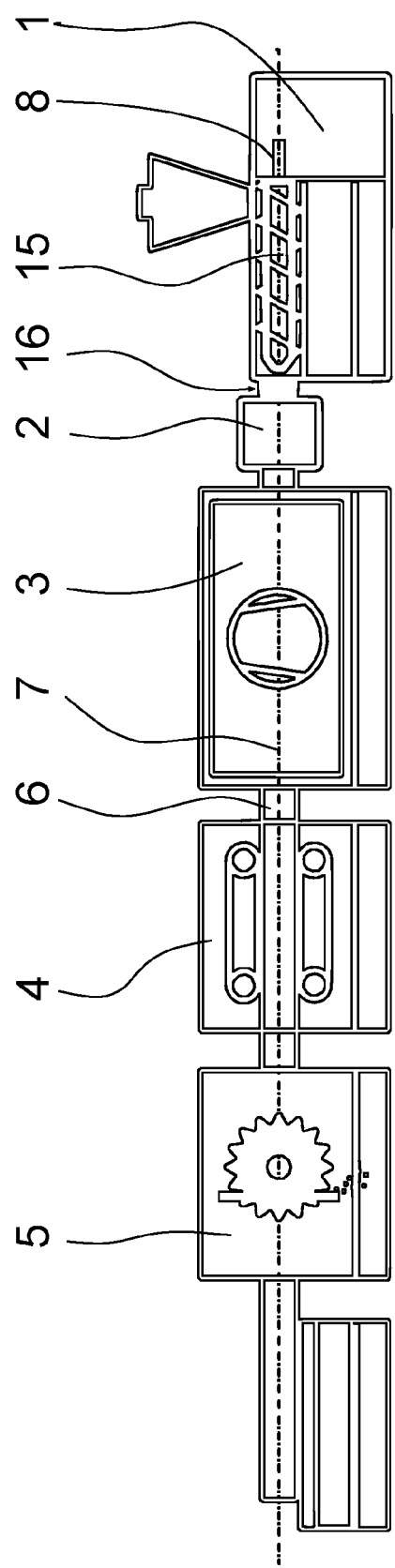
FIG. 1 shows a typical extrusion line.

In an embodiment, the present disclosure provides a method and a device by means of which the discharge rate of the plastics composition can be kept constant.

In an embodiment, the discharge of the plastics composition at a transition region from the extruder to the extrusion die or in the extrusion die is kept constant by changing the rotational speed of the extruder screw, wherein the rotational-speed change is carried out within one revolution of the extruder screw.

By partially changing the rotational speed, the rotational speed is changed in a targeted manner precisely in the region in which the composition pressure fluctuates, thereby largely correcting said fluctuation. This ensures that the fluctuation is reduced to such an extent that it practically has no further impact on the discharge rate and product quality. This rotational-speed change need not be carried out during just one revolution of the extruder screw but can also be changed more generally.

If the flow of the composition or the composition pressure changes over a relatively long period of time, the rotational speed can also be adjusted more generally using automatic rotational-speed compensation such that a new basic rotational speed is set. This does not affect any partial adjustment on the basis of the new rotational speed.

During use in, for example, co-extrusion, this applies analogously to two or more plastics compositions.

According to an embodiment, the magnitude of the rotational-speed change is established on the basis of a mathematical model, wherein the required rotational-angle range within which the rotational speed of the extruder screw has to be changed can be determined using available measurement data on the pressure of the plastics composition.

The detected measurement data are stored and can be used as empirical values for products that have been already produced and the production of which is known to involve said fluctuations, in order to counteract and compensate for precisely these fluctuations. A multiplicity of measured values and other parameters can be incorporated therein. In turn, the current values are stored and enhance the future evaluation using the mathematical model. This is therefore a self-learning system that does not use any other empirical values.

According to an embodiment, however, the rotational-angle position of the extruder screw can additionally be sent to the machine controller using a trigger signal in order to assist the interactive learning process or even just to specify start and stop points of the rotational-speed change using said trigger signal.

In an embodiment, to determine the rotational-angle position of the extruder screw, there are arranged, in or on parts of the extruder screw, a transmitter, which rotates therewith, and, outside the extruder screw, a receiver that is stationary in relation to the extruder screw.

Thus, it is proposed to determine the relevant angular position of the screw and thus be able, when countering the occurring fluctuations, to specify precisely the region in which the screw rotational speed has to be changed. The usual fluctuations include pressure fluctuations or fluctuations in the flow of composition.

It is also advantageous to fit a composition pressure probe in the transition region from the extruder to the extrusion die. However, the probe can also be fitted at another suitable location.

According to an embodiment, a screw coupling bush is equipped with a securing screw, by means of which the screw coupling bush is held on the extruder screw in a precise position, the securing screw being configured such that it protrudes out of the screw coupling bush and acts as a transmitter.

In accordance with an embodiment of the invention, a part that already exists in the device, namely the securing screw that has been provided, can equally be used as the transmitter.

FIG. 1 shows a typical extrusion line as used nowadays for producing profiles, pipes, and also panels and films. It shows an extruder 1 comprising an extruder screw 15 and the screw coupling bush 8. Plastics material is melted in the extruder 1 and continuously fed into the extrusion die 2 for shaping. Adjoining this is a calibration and cooling station 3. Depending on the product, additional or different cooling stations or cooling lines (e.g., roller conveyors) can be inserted. A drawing device 4 follows the cooling stations of the cooling line. To cut the continuous products 6 to the desired length, a cutting device 5 is arranged next. The extrusion axis (=middle of the product) is denoted by reference sign 7. The transition region between the extruder 1 and the die 2 is denoted by reference sign 16.

Figure 2:
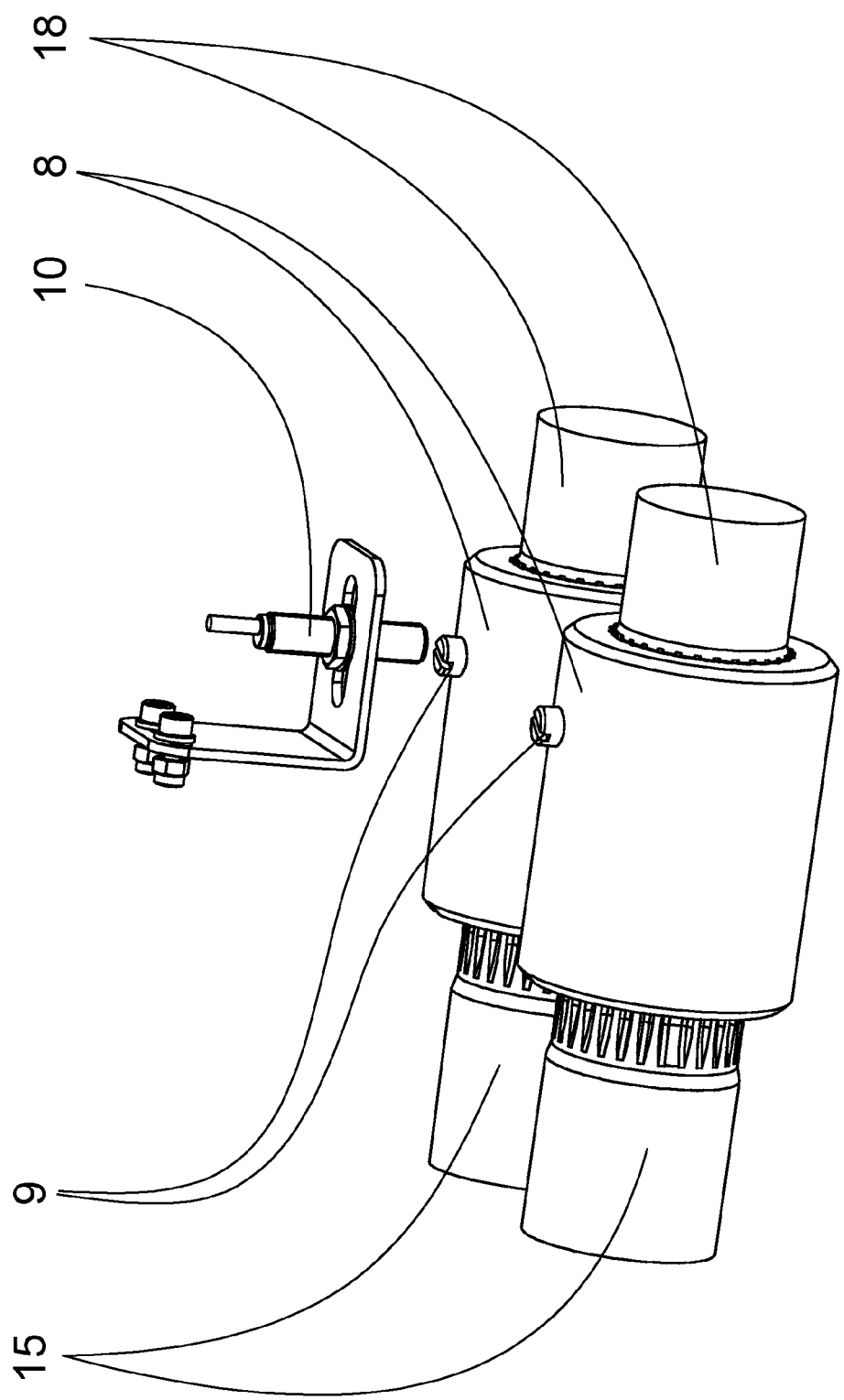
FIG. 2 shows a coupling bush by way of example.

FIG. 2 shows a detail illustrating the connection of the drive shafts 18 to an extruder screw 15 by means of a screw coupling bush 8 (here a double screw by way of example), which holds the extruder screw 15 in a precise position. In the region of each screw coupling 8, a securing screw can be seen, which prevents the screw coupling bush 8 from being inadvertently displaced. The securing screw projecting out of the screw coupling bush 8 is able to act as a transmitter 9 and thus to send a pulse to the extruder controller once per screw revolution by way of a proximity switch that is fitted in said region and acts as a receiver 10.

It is also conceivable for the transmitter 9 to be a pin, a hole, an RFID chip, an NFC tag, or even a mechanically actuated switch or similar means suitable for encoding. It goes without saying that the receiver 10 used then has to be adapted accordingly to said transmitted code. It may be a camera, a chip reader, a barcode scanner, etc., to name but a few.

Moreover, the screw coupling bush 8 need not necessarily be the receiving position for the transmitter/receiver combination; this position can also be in or on the transmission or the drive shaft, etc.

Figure 3:
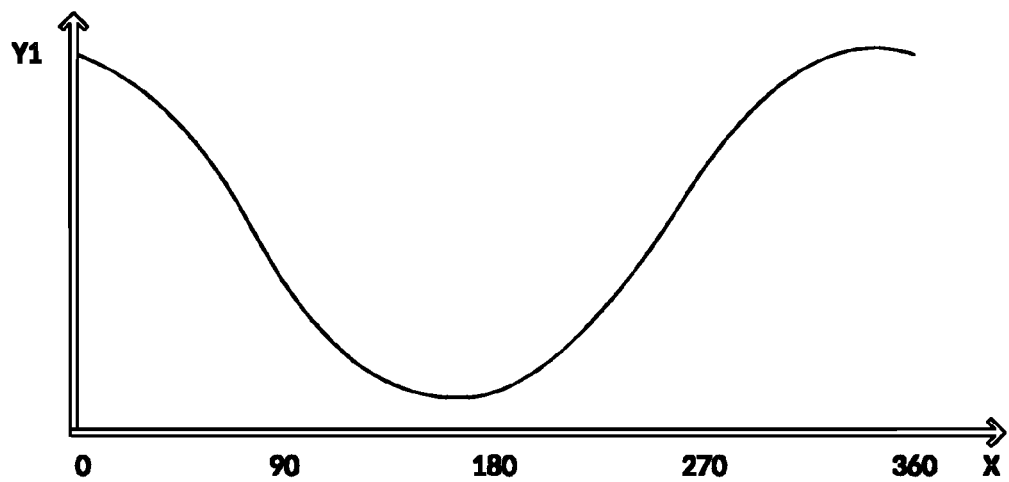
FIG. 3 shows a composition pressure fluctuation curve during rotation of the screw prior to composition pressure compensation.
Figure 4:
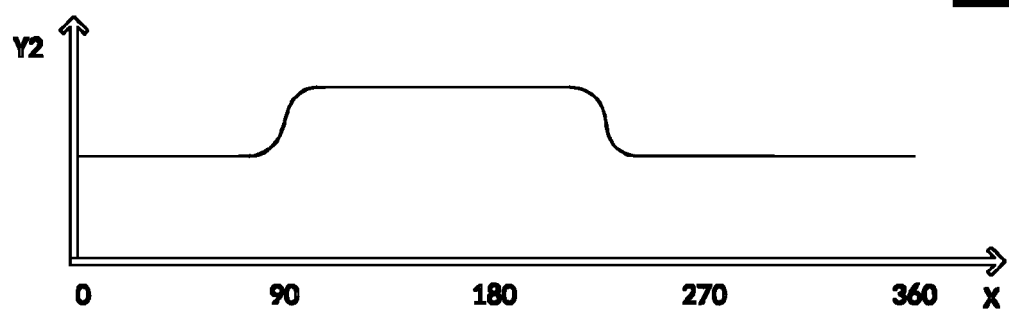
FIG. 4 shows a rotational-speed change curve during one screw revolution.
Figure 5:
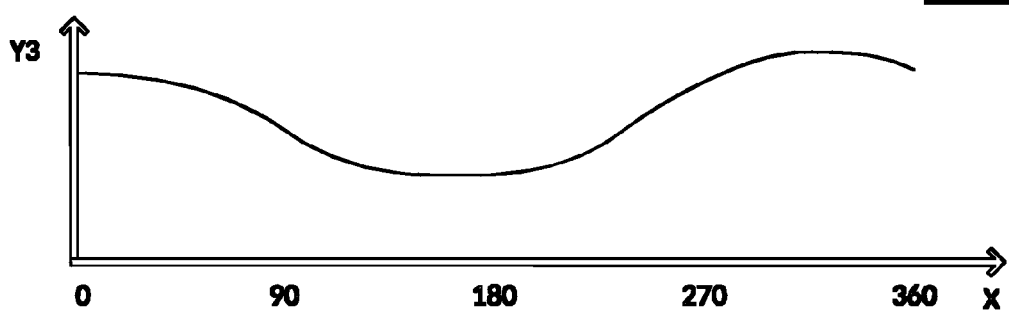
FIG. 5 shows a composition pressure compensation during rotation of the screw.

FIGS. 3 to 5 show the effect of an embodiment of the invention by way of example on the basis of three graphs. The angular position from 0° to 360° of the extruder screw 15 based on one revolution is plotted on the x axis in all three figures.

In FIG. 3, the y axis shows the pressure fluctuation in bar, and thus the fluctuation in the discharge of the plastics composition. Starting from the position 0°, the pressure drops and reaches a minimum at around 170°. Afterwards, the pressure rises again and reaches a maximum at around 350°. To counteract this fluctuation, the rotational speed of the extruder screw 15 is changed within a particular angular range.

In turn, FIG. 4 shows an increase in the rotational speed at an angular position of around 90° to approximately 220°, by way of example. The result of this is that the pressure fluctuation, and thus the fluctuation in the discharge, is largely compensated for, as can be clearly seen in FIG. 5. In this figure, as in FIG. 3, the y axis shows the fluctuation of the pressure of the plastics composition in bar, yet the fluctuation is much smaller due to the partial rotational-speed change.

Figure 6:
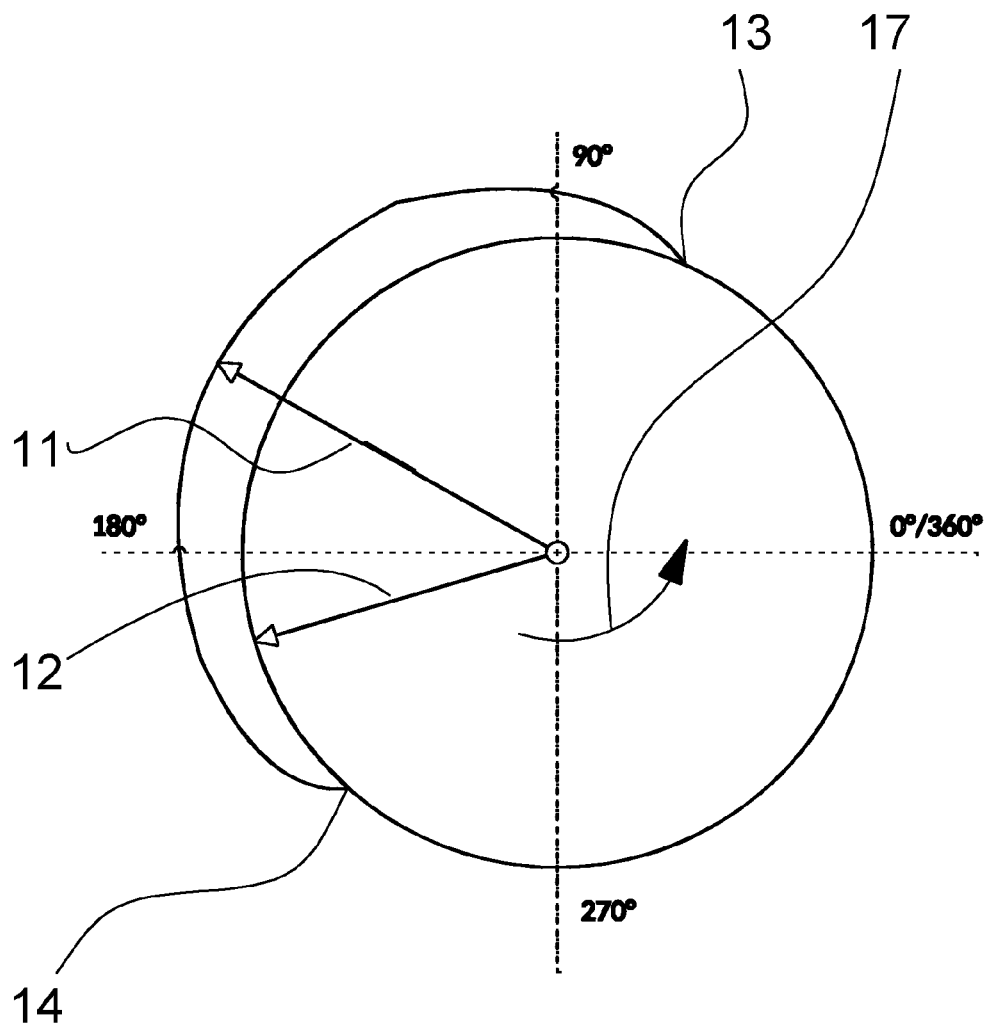
FIG. 6 shows a rotational-speed change of the extruder screw.

FIG. 6 shows this rotational-speed change according to FIG. 4 in a different depiction.

The rotational speed of the extruder screw 15 based on one revolution is shown as a circle having the angular positions from 0° to 360°. The predetermined rotational speed is shown as the first screw rotational speed 12, which is increased to a second screw rotational speed 11 in the range from around 80° to around 220°. The direction of rotation (counterclockwise in this case) is marked by reference sign 17. Consequently, the beginning of the rotational-speed increase at approximately 80° can be referred to as the starting angle 13, and the end of the rotational-speed increase at around 220° can be referred to as a stopping angle. If the direction of rotation 17 of the extruder screw 15 is changed to rotate clockwise, the starting angle becomes the stopping angle, and vice versa.

All the angular positions shown and described are only examples; any other range is possible and is determined by the angular position at which the fluctuations occur. The amplitude of the rotational-speed increase is also given by way of example and can differ. A method in which reductions in discharge are counteracted by increasing the rotational speed has been described above by way of example. Accordingly, it is also possible to have an implementation in which the rotational speed is lowered in regions having a higher discharge or pressure in order to even out the fluctuations.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Extruder
2 Extrusion die
3 Calibration and cooling tank
4 Drawing device
5 Cutting device
6 Plastics product
7 Extrusion axis
8 Screw coupling bush
9 Transmitter
10 Receiver
11 First screw rotational speed
12 Second screw rotational speed
13 Starting angle of 12
14 Stopping angle of 12
15 Extruder screw
16 Transition region from 1 to 2
17 Direction of rotation of 15
18 Drive shaft
X Screw rotation in °
Y1 Fluctuation of the pressure of the plastics composition in bar
Y2 Rotational-speed change of the screw drive in rpm
Y3 Compensated pressure fluctuations in bar

The invention claimed is:

1. A method for reducing fluctuations over time in discharge of a plastics composition when extruding plastics products, comprising:
melting plastics material in an extruder and supplying the plastics material to an extrusion die by way of one or more extruder screws arranged in the extruder; and
conveying a plastics composition along an extrusion axis by rotating the one or more extruder screws as pressure builds up; and
changing a rotational speed of the one or more extruder screws to keep constant a discharge of the plastics material at a transition region from the extruder to the extrusion die or in the extrusion die,
wherein changing the rotational speed of the one or more extruder screws comprises increasing and then decreasing, or vice versa, the rotational speed of the one or more extruder screws,
wherein the changing of the rotational speed is carried out within one revolution of the one or more extruder screws,
wherein a magnitude of a rotational-speed change associated with the changing of the one or more extruder screws is established on the basis of a mathematical model,
wherein the changing of the rotational speed of the one or more extruder screws is configured to occur when the one or more extruder screws are at a plurality of rotational angles, and
wherein the plurality of rotational angles are within a range, the range being determined using available measurement data on a composition pressure of the plastics composition.

2. The method according to claim 1, wherein a rotational-angle position of the one or more extruder screws is transmitted to a machine controller by way of a trigger signal.

3. The method according to claim 2, further comprising providing a screw coupling bush on each of the one or more extruder screws and a securing screw on each coupling bush, each securing screw configured to transmit a signal to the machine controller.

4. The method according to claim 3, wherein the signal transmitted by each securing screw comprises a pulse sent to the machine controller once per revolution of a respective extruder screw of the one or more extruder screws.

* * * * *